United States Patent
Tang

[19]

[11] Patent Number: 5,986,911
[45] Date of Patent: Nov. 16, 1999

[54] SECONDARY SIDE POST REGULATOR AND MULTIPLE OUTPUT POWER SUPPLY EMPLOYING THE SAME

[75] Inventor: Wei Tang, Plano, Tex.

[73] Assignee: Lucent Technologies, Inc., Murray Hill, N.J.

[21] Appl. No.: 09/030,313

[22] Filed: Feb. 25, 1998

[51] Int. Cl.$^6$ .......................... H02M 7/155; H02M 3/335
[52] U.S. Cl. ................................. 363/89; 363/21
[58] Field of Search ................................. 363/78, 81, 84, 363/89, 95, 97, 20, 21; 323/282, 222

[56] References Cited

U.S. PATENT DOCUMENTS 5,565,761  10/1996  Hwang ..................................... 323/222

OTHER PUBLICATIONS

A. Capel, "Charge Controlled Conversion Principle in DC/DC Regulators Combines Dynamic Performances and Highoutput Power," 1979 IEEE, pp. 264–276.

P. Maranesi and G. Naummi, "Computer–Aided Identification of the Small–Signal Model of Power–Electronics Systems," 1991 IEEE, pp. 62–66.

Wei Tang, Fred C. Lee and raymond B. Ridley, "Charge Control: Modeling, Analysis and Design," 1993 IEEE, pp. 396–403.

W. Tand, Y.M. Jiang, G.C. Hua, F.C. Lee and I. Cohen, "Power Factor Correction With Flyback Converter Employing Charge Control," pp. 91–96.

Zheren Lai and Keyue M. Smedley, "A Family of Power–FActor–Correction Controllers," 1997 IEEE, pp. 66–73.

Wei Tang, Ching–Shan Leu and Fred C. Lee, "Charge Control For Zero–Voltage–Switching Multoresonant Converter,"1996 IEEE, pp. 270–273.

*Primary Examiner*—Adolf Deneke Berhane

[57] ABSTRACT

For use with a multiple output power converter, a secondary side post regulator (SSPR), a method of secondary side post regulating a multiple output power converter and a multiple output multiple output power converter employing the SSPR or the method. In one embodiment, the SSPR includes: (1) an average input current sensing circuit that senses a current flowing through a switch to be controlled in the multiple output power converter and develops therefrom an intermediate signal that is a function of an average of the current and (2) an input voltage feedforward circuit, coupled between an input of the multiple output power converter and the average input current sensing circuit, that adjusts the intermediate signal based on an input voltage of the multiple output power converter to develop a control signal that is a function of both the input voltage and the average of the current thereby to allow trailing edge control to be employed to control an output of said multiple output power converter.

20 Claims, 3 Drawing Sheets ns,986,911

SECONDARY SIDE POST REGULATOR AND MULTIPLE OUTPUT POWER SUPPLY EMPLOYING THE SAME

TECHNICAL FIELD OF THE INVENTION

The present invention is directed, in general, to power conversion and, more specifically, to a secondary side post regulator (SSPR) and a multiple output power supply that employs such regulator.

BACKGROUND OF THE INVENTION

Switch mode power converters (SMPC) that convert AC or DC input power into DC output(s) frequently have multiple outputs. These outputs are often derived from multiple secondary windings on a single power transformer. In an SMPC, the primary winding of the power transformer is switched or commutated to the input voltage source by power switches in such a way as to provide pulses at the appropriate current and voltage levels on the secondary outputs. The DC secondary outputs are formed via rectification and subsequent filtering of the pulse train on the transformer secondaries. Each DC output voltage level depends on a turns ratio of the respective secondary windings to the primary winding as well as the ratio of the pulse width to the switching period.

The DC output voltages are then directly or indirectly regulated by a control feedback circuit. Direct regulation occurs when the feedback circuit senses at least one of the DC outputs (usually called the main output) and then modifies the switching pattern of the power switches to compensate for changes in the load or in the input voltage, thereby keeping the DC voltage level on the regulated main output relatively constant. There are many possible methods of SMPC regulation including, for instance, pulse width modulation (PWM). PWM, as a matter of fact, is one of the more widely used control and switching methods.

The SMPC feedback control usually provides quite an adequate technique of regulating the main output. In the case of PWM control, the load current variations or the input voltage variations are compensated by the feedback control loop and the proscribed output voltage level is maintained. In such an arrangement, however, the auxiliary outputs do not have the full benefits of the main feedback loop regulation. Although the main feedback loop provides some measure of regulation (cross-regulation) to the auxiliary outputs due to transformer coupling, in many cases this is inadequate and some additional techniques are needed to regulate the auxiliary outputs (post-regulation).

A typical approach to feedback control for a secondary side post regulator (SSPR) is to employ peak current-mode control (PCM) of the primary side switch of the SMPC, which permits cycle-by-cycle current limiting and overcurrent protection. Since the reflected output currents flow through the primary side switch, however, the secondary side switches must be simultaneously turned off with the primary side switch to ensure that the PCM control scheme will function properly. The simultaneous switching requirement limits the controlling of the secondary side switches to a leading-edge modulation scheme.

The use of a leading-edge modulation scheme whereby the leading-edge of the secondary side drive signal is modulated, however, introduces dynamic coupling and synchronization problems. The dynamic coupling between the secondary outputs allows perturbations or disturbances in one output to affect the other outputs. Additionally, since both trailing and leading edges of the secondary side drive signals are modulated, the primary and secondary side switches cannot be synchronized, resulting in increased electro-magnetic-interference (EMI) from the different switching frequencies.

Accordingly, there is a need in the art for an improved system and control method for secondary side post regulation that overcomes the above-described limitations.

SUMMARY OF THE INVENTION

To address the above-discussed deficiencies of the prior art, the present invention provides, for use with a multiple output power converter, a secondary side post regulator (SSPR), a method of secondary side post regulating a multiple output power converter and a multiple output power converter employing the SSPR or the method. In one embodiment, the SSPR includes: (1) an average input current sensing circuit that senses a current flowing through a switch to be controlled in the multiple output power converter and develops therefrom an intermediate signal that is a function of an average of the current and (2) an input voltage feedforward circuit, coupled between an input of the multiple output power converter and the average input current sensing circuit, that adjusts the intermediate signal based on an input voltage of the multiple output power converter to develop a control signal that is a function of both the input voltage and the average of the current thereby to allow trailing edge control to be employed to control an output or outputs of said multiple output power converter.

The present invention therefore introduces an SSPR control technique that includes a forward-fed component of the multiple output power converter's input voltage. By adjusting the intermediate signal by the input voltage, trailing edge modulation control can be made to replace conventional leading edge PCM control techniques without sacrificing cycle-by-cycle current limiting or overcurrent protection.

In one embodiment of the present invention, the average input current sensing circuit comprises: (1) a current sensor that senses the current flowing through the switch and (2) a charge storage device, coupled to the current sensor, that accumulates charge as a function of a magnitude of the current, a voltage of the charge storage device indicating the average of the current. In a related, more specific embodiment, the average input current sensing circuit further comprises a reset switch that intermittently discharges the charge storage device. In still another related, more specific embodiment, the average input current sensing circuit comprises a diode that blocks a reverse flow of the charge from the charge storage device to the current sensor. In these embodiments, the intermediate signal takes the form of a ramp having an attack rate that is a function of converter average switch current and a relatively quick decay rate (brought about by closure of the reset switch).

In one embodiment of the present invention, the input voltage feedforward circuit comprises a scaling resistor that scales the input voltage of the multiple output power converter to provide an input voltage DC offset.

In one embodiment of the present invention, the SSPR further includes a PWM drive circuit that develops a PWM signal based on the control signal. Those skilled in the art are familiar with PWM control. Other modulation control falls within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
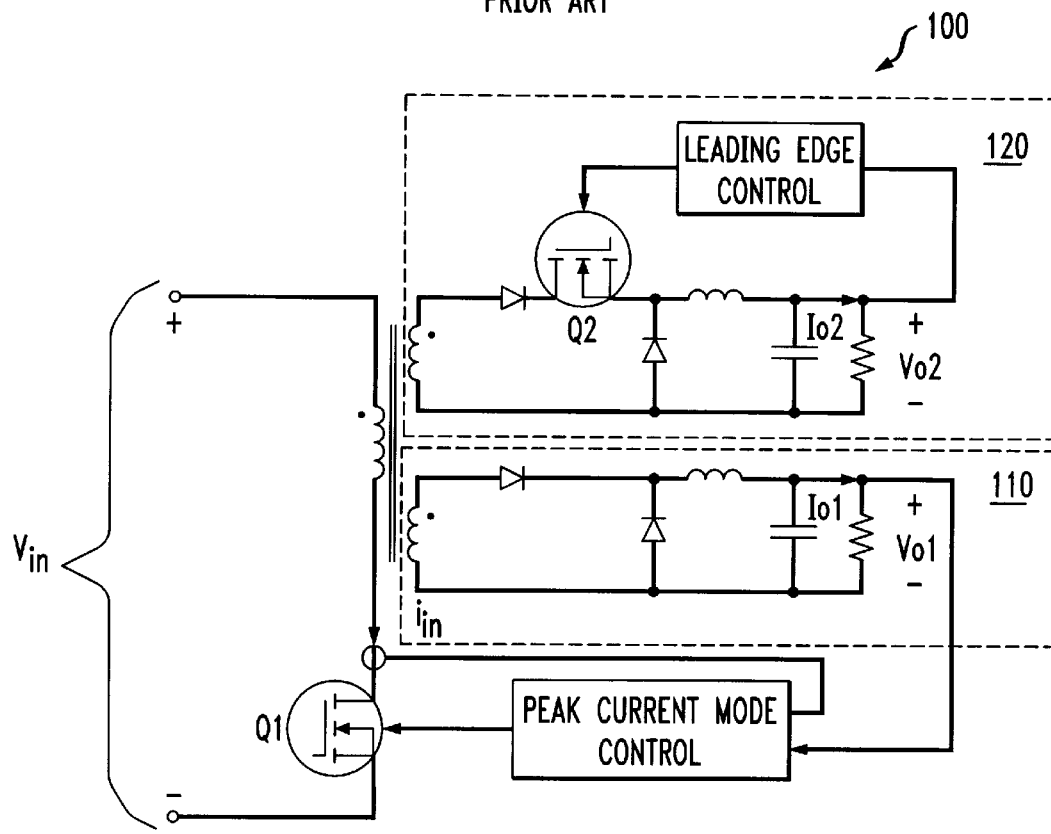
FIG. 1 illustrates a schematic diagram of a conventional multiple output DC/DC power converter with a secondary side post regulator (SSPR)

Referring initially to FIG. 1, illustrated is a schematic diagram of a conventional multiple output DC/DC power converter 100 with a secondary side post regulator (SSPR). The power converter 100 is shown with first and second output circuits 110, 120, which provide first and second DC output voltages Vo1, Vo2, respectively. The switching of a primary side switch Q1 is typically controlled using a conventional peak current mode (PCM) controller, which permits cycle-by-cycle current limiting and overcurrent protection. Since both of the reflected output currents in the first and second output circuits 110, 120 flow through the primary side switch Q1 when primary side switch Q1 is ON, i.e., conducting, a secondary side switch Q2 must be turned OFF, i.e., not conducting, simultaneously with the primary side switch Q1 to ensure that the PCM control scheme employed to control the switching of the primary side switch Q1 is functioning properly. The above described requirement that both primary and secondary side switches Q1, Q2 be turned OFF simultaneously limits controlling the secondary side switch Q2 with a leading-edge modulation scheme. The limitations of the above control scheme for SSPR will be described in greater detail with respect to FIG. 2 and with continuing reference to FIG. 1.

Figure 2:
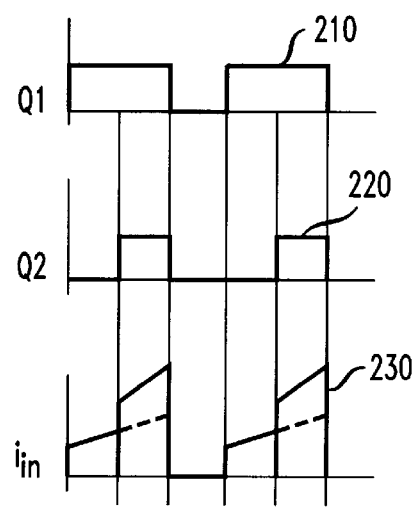
FIG. 2 illustrates primary and secondary side drive signals and a current waveform through the primary side switch of the converter of FIG. 1.

Turning now to FIG. 2, illustrated are primary and secondary side drive signals 210, 220 and a current waveform 230 through the primary side switch Q1 of t he converter 100 of FIG. 1. The primary and secondary side drive signals 210, 220 are used to control the switching of the primary side switch Q1 and the secondary side switch Q2, respectively. The current waveform 230 illustrates a current $i_{in}$ flowing through the primary side switch Q1.

The use of a leading-edge control scheme for the secondary side switch Q2 introduces dynamic coupling and synchronization problems. Since the leading-edge of the secondary side drive signal 220 is modulated, perturbations or disturbances in the first output circuit 110 also affect the other output circuit. Furthermore, since both trailing and leading edges of the secondary side drive signal 220 are modulated, the primary and secondary side switches Q1, Q2 cannot be synchronized resulting in increased electrotagnetic-interference (EMI) from the different switching frequencies.

Replacing the secondary side switch Q2 leading-edge control scheme with a trailing-edge control scheme to overcome the previously described limitations, however, precludes the use of PCM control of the primary side switch Q1. Since both of the reflected output currents in the first and second output circuits 110, 120 flow through the primary side switch Q1 when primary side switch Q1 is conducting, the secondary side switch Q2 must be turned OFF simultaneously with the primary side switch Q1 to ensure that the PCM control scheme employed to control the switching of the primary side switch Q1 is functioning properly. The first and second output circuits 110, 120, however, are typically supplying different electrical loads with differing power requirements. The differing power requirements, in turn, results in the different duty cycles of the primary and secondary side switches Q1, Q2, as illustrated by the primary and secondary side drive signals 210, 220 in FIG. 2. If a trailing-edge control scheme is employed to control the secondary side switch Q2, i.e., both the primary and secondary side switches Q1, Q2 are turned on at the same time, the primary and secondary side switches Q1, Q2 may not be turned OFF at the same time due to the different duty cycles of the switches. Thus, the above described requirement that both primary and secondary side switches Q1, Q2 be turned OFF simultaneously limits controlling the secondary side switch Q2 with a leading-edge modulation scheme. Consequently, there is a problem with employing trailing edge modulation control methods with PCM control techniques of the primary switch Q1 that cannot be resolved in view of the conventional circuits.

The present invention discloses an SSPR control technique that includes a forward-fed component of the power converter's input voltage. By integrating the primary side switch's Q1 current and adjusting the intermediate signal by the input voltage, trailing edge modulation control can be made to replace conventional leading edge control techniques without sacrificing the advantages, for instance, of PCM control, e.g., cycle-by-cycle current limiting or overcurrent protection.

Figure 3:
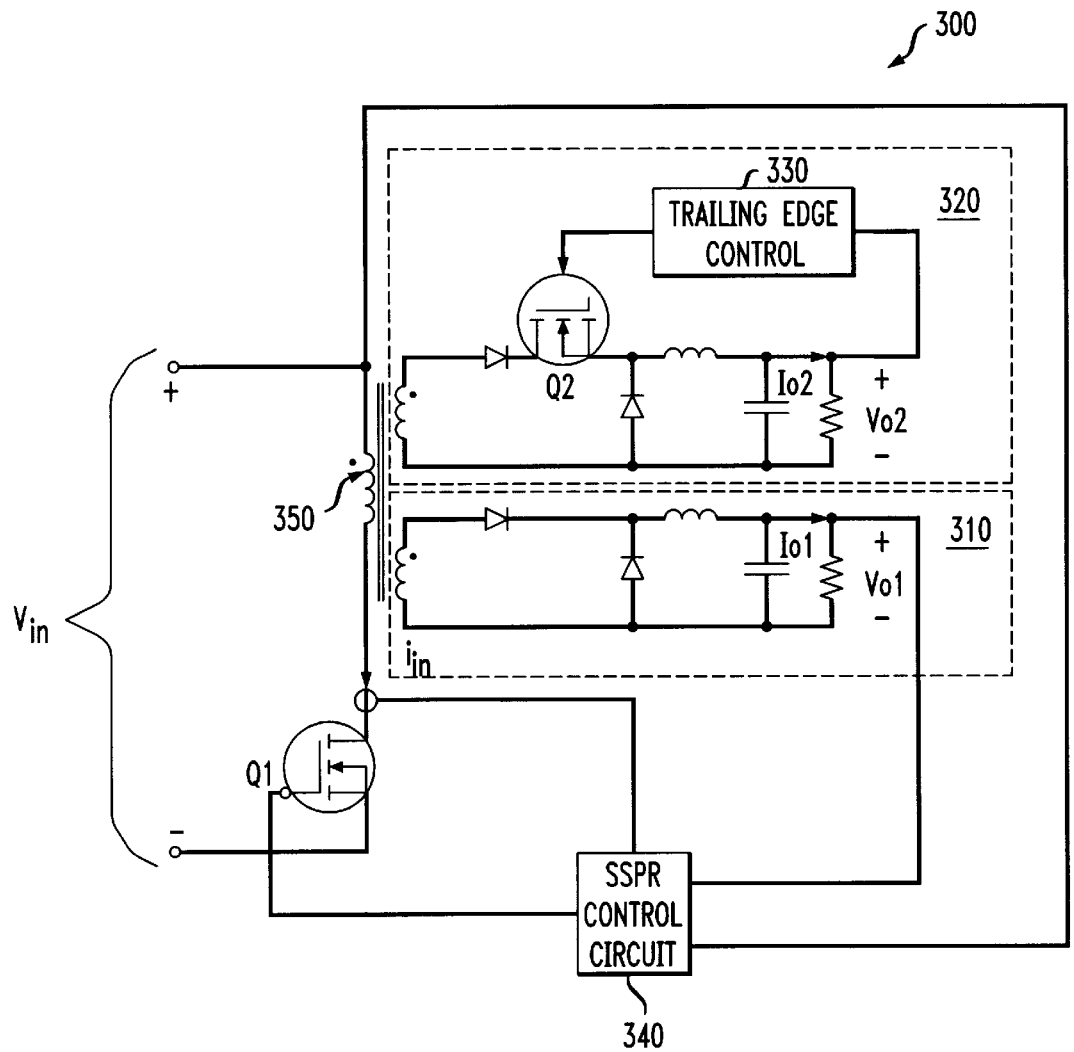
FIG. 3 illustrates a schematic diagram of an embodiment of a multiple output DC/DC power converter employing an embodiment of a secondary side post regulator (SSPR) constructed according to the principles of the present invention.

Turning now to FIG. 3, illustrated is a schematic diagram of an embodiment of a multiple output DC/DC power converter 300 employing an embodiment of a secondary side post regulator (SSPR) 340 constructed according to the principles of the present invention. The power converter 300 includes first and second output circuits 310, 320, that are coupled to a power transformer 350, which provide first and second DC output voltages Vo1, Vo2, respectively. The power transformer 350 is coupled to an input voltage source Vin and a primary side switch Q1 that is coupled to a control circuit 340. In the illustrated embodiment a two output converter is shown, however, the present invention is not limited to a two-output power converter. The second output circuit 320 employs a conventional trailing-edge controller 330 to control the switching of a secondary side switch Q2 while the SSPR control circuit 340 is used to control the switching of the primary side switch Q1.

Figure 4:
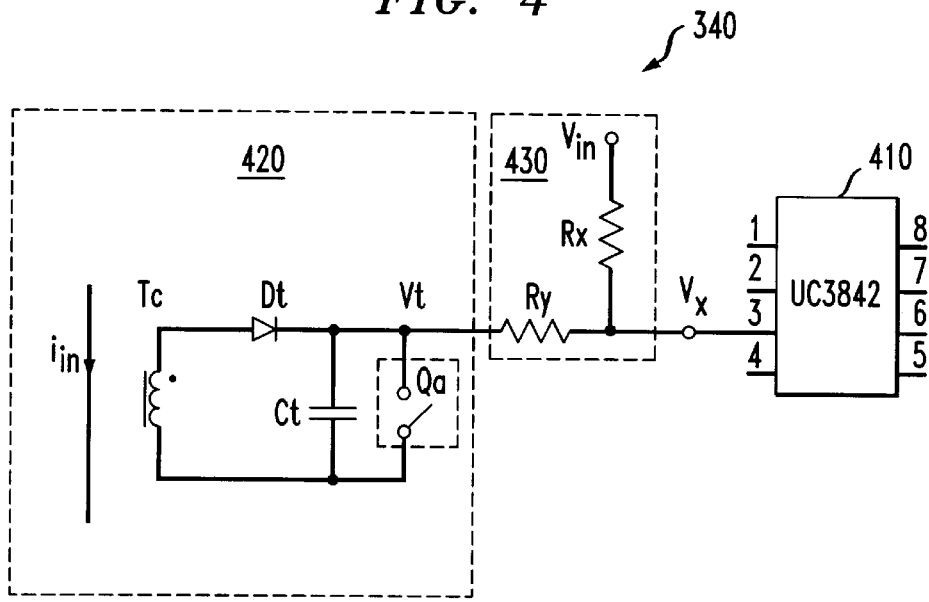
FIG. 4 illustrates a schematic diagram of the secondary side post regulator control circuit of FIG. 3.

Turning now to FIG. 4, illustrated is a schematic diagram of the SSPR control circuit 340 of FIG. 3. The control circuit 340 includes a current sensor Tc (a current transformer is shown) that is coupled to a diode Dt, a charge storage device Ct (a capacitor is shown) and a reset switch Qa. The current sensor TC, diode Dt, capacitor Ct and reset switch Qa comprise an average input current sensing circuit 420. The diode Dt is also coupled to a first scaling resistor Ry which is coupled to the input voltage Vin through a second scaling resistor Rx. An input voltage feedforward circuit 430 includes the first and second scaling resistors Rx, Ry. The first and second scaling resistors Rx, Ry are also coupled to a peak current mode (PCM) controller (e.g., a manufacturer model number UC3842, by Unitrobe Corporation of Merrimack, N.H.) 410. The average input current sensing circuit 420, in combination with The input voltage feedforward circuit 430, provides a control signal Vx to t he controller 410. While the peak current mode controller 410 is a Unitrobe UC3842 integrated circuit employing a pulse-width-modulation (PWM) drive signal to the primary sido switch Qa, other peak current mode controllers are well within the broad scope of the present invention.

The operation of the control circuit 340 will be described in greater detail with reference to FIG. 5 and with continuing reference to FIGS. 3 and 4.

Figure 5:
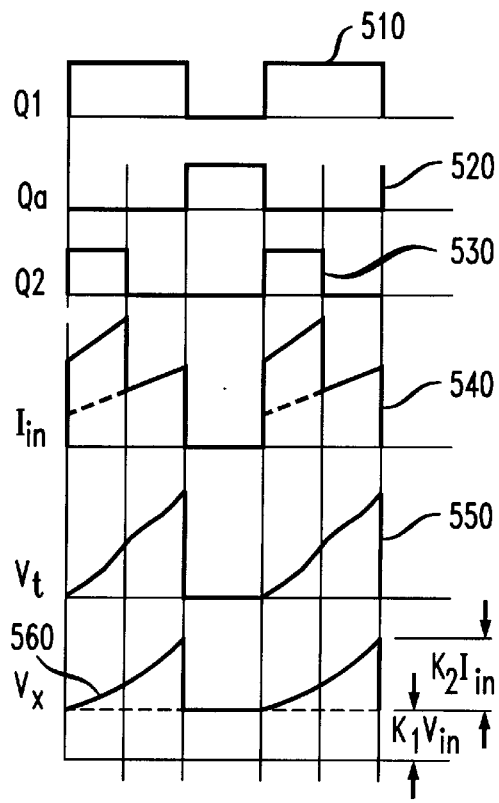
FIG. 5 illustrates exemplary current, voltage, control and drive waveforms for various components in the power converter of FIG. 3.

Turning now to FIG. 5, illustrated are exemplary current, voltage, control and drive waveforms for various components in the power converter 300 of FIG. 3. First, second and third drive waveforms 510, 520, 530 are drive signals used to control the primary side switch Q1, the reset switch Qa and the secondary side switch Q2, respectively. A fourth waveform 540 represents a current $i_{in}$ through the primary side switch Q1 and a fifth waveform 550 represents a charge Vt across the capacitor Ct. A sixth waveform 560 represents the control signal Vx.

The current sensor Tc senses the current $i_{in}$ through the primary side switch Q1 when the primary side switch Q1 is ON and the sensed current is used to charge the capacitor Ct. As the primary side switch current $i_{in}$ increases, the charge Vt on the capacitor Ct also increases with time since it is proportional to the area under the current $i_{in}$ waveform, as illustrated by the fourth and fifth waveforms 540, 550. When the primary side switch Q1 is turned off, the reset switch Qa is turned ON (the primary side switch Q1 and reset switch Qa are operated in a complementary fashion) and the capacitor Ct is discharged to zero. The charge Vt is proportional to the average input current Iin of the power converter 300 and since the capacitor Ct is discharged at the end of every switching cycle, the current $i_{in}$ is also averaged on a per cycle basis.

The charge Vt, however, cannot be used as the control signal because cycle-by-cycle current limiting and over current protection cannot be achieved under these circumstances. More specifically, since limiting the charge Vt only limits the average input current Iin, the charge Vt does not account for the variations in input voltage thereby leading to the aforementioned limitations. To incorporate the effect of input line voltage, an input voltage feedforward signal is used in the SSPR control scheme. The control signal Vx is a linear combination of the input voltage Vin and the average input current Iin, and is described by the following equation:

$$Vx = k1 \cdot Vin + k2 \cdot Iin \quad (1)$$

where k1 and k2 are variables. The input voltage Vin and average input current Iin must also satisfy the power balance equation:

$$Vin \cdot Iin = Po/\eta \quad (2)$$

where Po is the output power of the converter and η is the efficiency of the converter. Substituting equation (2) into (1), we have:

$$V_x = k1\ V_{in} + k2 \frac{P_o}{V_{in}\eta} \quad (3)$$

By limiting the control signal Vx, a cycle-by-cycle constant power limiting control is obtained. The values of the variables k1, k2 can solved by setting equation (3) equal to one at the input voltage minimum and maximum Vin,min, Vin, max, respectively. For the control circuit 340 illustrated in FIG. 4:

$$V_x = \frac{R_y}{R_x + R_y} V_{in} + \frac{R_x}{R_x + R_y} \cdot \frac{T_s}{C_T \cdot N_c} I_{in} \quad (4)$$

where $N_c$ is the turns ration for the current transformer Tc and $T_s$ is the switching period of the primary side switch Q1. The values of the first and second scaling resistors Rx, Ry and the capacitor Ct can be determined after solving for the variables k1, k2.

From the above, it is apparent that the present invention provides a control system employing a control signal that is a function of both the input voltage and the average of the current. The present invention uses the integration of a primary side switch current, i.e., charge Vt, and an input voltage feedforward signal to control the switching of the primary side switch. Since the integration of the primary side switch's current, or the total charge, is monotonically increasing at the time the primary side switch is turned OFF, cycle-by-cycle current limiting and overcurrent protection can be obtained without requiring both primary and secondary side switches to be simultaneously turned OFF as with PCM control. Removing the requirement that the switches be turned OFF simultaneously permits trailing edge control to be employed to control an output or outputs of multiple output power converters. Consequently, the dynamic responses between the multiple outputs are decoupled, making each output less susceptible to disturbances or perturbations occurring in another output circuit. Additionally, removing the requirement that the switches be turned OFF simultaneously also allows the primary and secondary side switches to be synchronized, i.e., turning both primary and secondary side switches ON at the same time, which in turn will reduce the EMI generated by the power converter.

Exemplary embodiments of the present invention have been illustrated above with reference to specific electronic components. Those skilled in the art are aware, however, that components may be substituted (not necessarily with components of the same type) to create desired conditions or accomplish desired results. For instance, multiple components may be substituted for a single component and vice-versa. Finally, those skilled in the art are aware that even though only one type of power converter was referenced above, other converter topologies are also within the broad scope of the present invention.

For a better understanding of power electronics, power converter topologies, such as forward power converters, and control circuits, see: *Principles of Power Electronics*, by J. Kassakian and M. Schlecht, Addison-Wesley Publishing Company (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a multiple output power converter, a secondary side post regulator (SSPR), comprising:
   an average input current sensing circuit that senses a current flowing through a switch to be controlled in said multiple output power converter and develops therefrom an intermediate signal that is a function of an average of said current;
   an input voltage feedforward circuit, coupled between an input of said multiple output power converter and said average input current sensing circuit, that adjusts said intermediate signal based on an input voltage of said multiple output power converter to develop a control signal that is a function of both said input voltage and said average of said current thereby to allow trailing edge control to be employed to control an output of said multiple output power converter.

2. The SSPR as recited in claim 1 wherein said average input current sensing circuit comprises:
   a current sensor that senses said current flowing through said switch; and
   a charge storage device, coupled to said current sensor, that accumulates charge as a function of a magnitude of said current, a voltage of said charge storage device indicating said average of said current.

3. The SSPR as recited in claim 2 wherein said average input current sensing circuit further comprises a reset switch that intermittently discharges said charge storage device.

4. The SSPR as recited in claim 2 wherein said average input current sensing circuit comprises a diode that blocks a reverse flow of said charge from said charge storage device to said current sensor.

5. The SSPR as recited in claim 1 wherein said output of said multiple output power converter is controlled with a trailing-edge controller.

6. The SSPR as recited in claim 1 wherein said input voltage feedforward circuit comprises a scaling resistor that scales said input voltage of said multiple output power converter.

7. The SSPR as recited in claim 1 further comprising a pulse width modulation (PWM) drive circuit that develops a PWM signal based on said control signal.

8. For use with a multiple output power converter, a method of achieving secondary side post regulation, comprising the steps of:
   sensing a current flowing through a switch to be controlled in said multiple output power converter;
   developing from said current an intermediate signal that is a function of an average of said current; and
   adjusting said intermediate signal based on an input voltage of said multiple output power converter thereby to allow trailing edge control to be employed to control an output of said multiple output power converter.

9. The method as recited in claim 8 wherein said step of developing comprises the step of accumulating charge as a function of a magnitude of said current in a charge storage device, a voltage of said charge storage device indicating said average of said current.

10. The method as recited in claim 9 wherein said step of developing further comprises the step of intermittently discharging said charge storage device.

11. The method as recited in claim 9 wherein said step of developing further comprises the step of blocking a reverse flow of said charge from said charge storage device to said current sensor.

12. The method as recited in claim 8 wherein said step of adjusting comprises the step of scaling said input voltage of said multiple output power converter.

13. The method as recited in claim 8 further comprising the step of developing a pulse-width-modulated (PWM) signal based on said intermediate signal.

14. A multiple output power converter, comprising:
   an input that receives electric power to be converted;
   an power transformer, coupled to said input, that transfers said electric power from a primary side to a secondary side thereof;
   first output circuit, coupled to said power transformer, that converts a first portion of said electric power and provides said first portion to a first output of said multiple output power converter;
   second output circuit, coupled to said power transformer, that converts a second portion of said electric power and provides said second portion to a second output of said multiple output power converter; and
   a secondary side post regulator (SSPR) for regulating at least one of said first and second outputs, including:
      an average input current sensing circuit that senses a current flowing through a switch to be controlled in said multiple output power converter and develops therefrom an intermediate signal that is a function of an average of said current, and
      an input voltage feedforward circuit, coupled between said input and said average input current sensing circuit, that adjusts said intermediate signal based on an input voltage of said multiple output power converter to develop a control signal that is a function of both said input voltage and said average of said current thereby to allow trailing edge control to be employed to control an output of said multiple output power converter.

15. The multiple output power converter as recited in claim 14 wherein said average input current sensing circuit comprises:
   a current sensor that senses said current flowing through said switch; and
   a charge storage device, coupled to said current sensor, that accumulates charge as a function of a magnitude of said current, a voltage of said charge storage device indicating said average of said current.

16. The multiple output power converter as recited in claim 15 wherein said average input current sensing circuit further comprises a reset switch that intermittently discharges said charge storage device.

17. The multiple output power converter as recited in claim 15 wherein said average input current sensing circuit comprises a diode that blocks a reverse flow of said charge from said charge storage device to said current sensor.

18. The multiple output power converter as recited in claim 14 wherein said first output circuit comprises a trailing-edge controller.

19. The multiple output power converter as recited in claim 14 wherein said input voltage feedforward circuit comprises a scaling resistor that scales said input voltage of said multiple output power converter.

20. The multiple output power converter as recited in claim 14 wherein said SSPR further comprising a pulse width modulation (PWM) drive circuit that develops a PWM signal based on said control signal.

* * * * *